United States Patent
Naik et al.

(10) Patent No.: US 7,555,608 B2
(45) Date of Patent: Jun. 30, 2009

(54) TECHNIQUES TO MANAGE A FLOW CACHE

(75) Inventors: Uday Naik, Fremont, CA (US); Alok Kumar, Santa Clara, CA (US); Harshawardhan Vipat, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 209 days.

(21) Appl. No.: 11/353,600

(22) Filed: Feb. 13, 2006

(65) Prior Publication Data

US 2007/0192543 A1  Aug. 16, 2007

(51) Int. Cl.
*G06F 12/00* (2006.01)
(52) U.S. Cl. ...................................... 711/133
(58) Field of Classification Search .................. None
See application file for complete search history.

(56) References Cited

U.S. PATENT DOCUMENTS

2007/0156966 A1 * 7/2007 Sundarrajan et al. ........ 711/133

* cited by examiner

*Primary Examiner*—Hiep T Nguyen
(74) *Attorney, Agent, or Firm*—Caven & Aghevli LLC

(57) ABSTRACT

Techniques are described herein that may be used to invalidate all entries in a table. For example, the table may be a flow cache. For example, an expiry time may be associated with one or more entries in the table. The expiry time of an entry may be initially set to the sum of the system time, the expiry time of the protocol associated with the entry, and a global time variable. To check if the entry is expired at any time, the current system time may be added to the global time variable and if the result is greater than the expiry time in the entry, then the entry is expired. To invalidate all the entries, the global time variable may be incremented by a large amount which may equal the maximum expiry time of all protocols. This may cause all entries to expire. New entries may be added using the new incremented value of the global time variable and will hence not expire.

22 Claims, 5 Drawing Sheets

TECHNIQUES TO MANAGE A FLOW CACHE

FIELD

The subject matter disclosed herein relates to techniques to invalidate entries in a flow cache.

RELATED ART

Packet classification is an important component of packet processing. Packet classification may take place prior to processing of the packet. For example, packet processing may include but is not limited to, Internet Protocol (IP) forwarding, firewall, network address translation (NAT), IP Security Protocol (IPsec) encryption and decryption, Transmission Control Protocol (TCP) processing, and quality of service (QoS). Packet classification may be based on values in the fields of the packet header which may be compared against pre-defined rules or policies. Packet classification rules can be very complicated because of consideration of multiple packet header fields with matching prefixes or ranges for each field. Accordingly, to perform packet classification for every packet is very compute intensive. A common optimization to avoid packet classification for every packet is to maintain a flow cache.

The flow cache may maintain packet classification results for flows associated with packets that have been examined in the recent past. A flow may correspond to packets on a single TCP connection or packets on a User Datagram Protocol (UDP) stream with the same 5 tuple values (e.g., source IP address, destination IP address, source port, destination port, and protocol). The same classification rule or policy may apply to packets belonging to a single flow. The flow cache is typically maintained using hash tables and can be very efficiently accessed. Therefore, maintaining a flow cache provides a significant performance advantage as most of the traffic is matched in the flow cache itself and full range match or prefix match packet classification is only performed for a small portion of the packets (e.g., the first packet of every flow).

BRIEF DESCRIPTION OF THE DRAWINGS

Embodiments of the present invention are illustrated by way of example, and not by way of limitation, in the figures of the accompanying drawings and in which like reference numerals refer to similar elements.

DETAILED DESCRIPTION

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "an embodiment" in various places throughout this specification are not necessarily all referring to the same embodiment. Furthermore, the particular features, structures, or characteristics may be combined in one or more embodiments.

Each entry in a flow cache may be associated with a single flow and may at least store identification parameters and packet processing actions for the flow. Updating the classification rules associated with entries in a flow cache may raise issues. One approach to updating the flow cache is to invalidate all entries in the flow cache when any classification rule is updated. Invalidating the entries at least renders them unavailable for use.

One common approach to invalidate the flow cache is to invalidate all entries in the flow cache one entry at a time. Another common approach to invalidate entries in a flow cache is to change the hash table pointer to an empty hash table and then, invalidate the old hash table offline in order to prepare the old hash table for the next update.

Some embodiments of the present invention may provide for techniques to invalidate all entries in a flow cache. When a new entry is added to flow cache, a corresponding flow expiry timestamp is provided that can be used to determine when the entry is to become invalid. In addition, a global variable timestamp_fast_forward may be maintained. When the flow entry is created, variable timestamp_fast_forward may be added to the flow expiry timestamp. When a packet arrives belonging to a particular flow, the current time may be determined by the sum of current system time and the global variable timestamp_fast_forward. If the determined current time exceeds the flow expiry timestamp for the flow cache entry, the entry is considered invalid.

When a classification rule is to be updated, all entries in the flow cache are to be invalidated. To invalidate the entries, the global time variable is incremented by a very large value such that the expiry times for all flow cache entries are exceeded. The large value may correspond to the maximum expiry time of all protocols. Accordingly, a next time there is any access to an entry in the flow cache, the entry may be found to be invalid. A new classification may be performed to update the flow entry and a new expiry timestamp may be determined using the new value of timestamp_fast_forward and stored in the flow cache entry. The updated entry will stay valid at least until the global variable timestamp_fast_forward is again incremented by a large value or the updated entry otherwise expires in due course of time.

Figure 1:
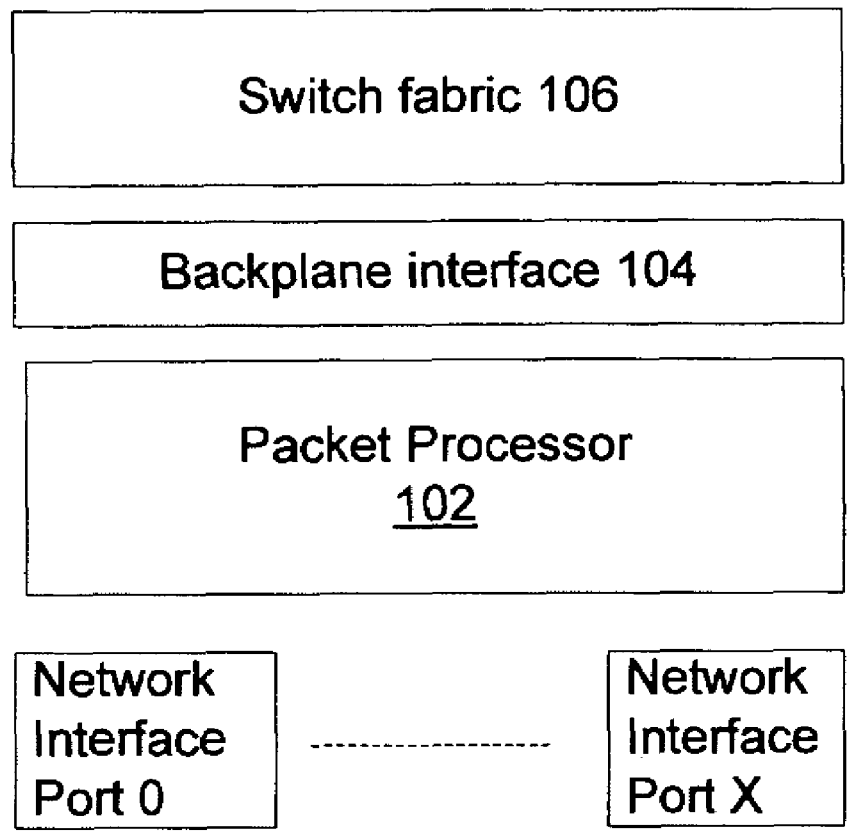
FIG. 1 depicts an example system embodiment in accordance with some embodiments of the present invention.

FIG. 1 depicts a suitable system diagram in accordance with some embodiments of the present invention. For example, the system of FIG. 1 may be implemented on a single line card. There may be any number of network interface ports. Network interface ports may be Ethernet, ATM, or any other type of interface. Network interface ports may be capable to transmit and receive packets or frames in accordance with any protocols to any type of network. As used herein, a packet includes a header and payload portion encoded according to any protocol.

Packet processor 102 may perform layer 2 or layer 3 (as well as other higher layer level) processing on payloads as well as operations such as, but not limited to, classification, metering and policing, queue management, transmit scheduling, and traffic shaping in conformance with applicable protocols. For example, packet processor 102 also may perform traffic management at the internet protocol (IP) layer (described for example in RFC 791 (1981) available from the Defense Advanced Research Projects Agency).

Packet processor 102 may intercommunicate with switch fabric 106 using a backplane interface 104 to transfer and receive packets having formats such as, but not limited to, High Level Data Link Control (HDLC), internet protocol (IP), Asynchronous Transfer Mode (ATM), Generic Framing Procedure (GFP), and Ethernet. Backplane interface 104 may communicatively couple packet processor 102 with other devices such as one or more transceiver linecard. For example, the one or more transceiver linecard may include a SONET/SDH add-drop multiplexer, a Fibre Channel compatible line input, an Ethernet line input, a SONET/SDH compatible transceiver.

In some embodiments, packet processor 102 may be combined with a central processing unit, memory, storage, as well as a display device and a user interface such as a keyboard.

Figure 2:
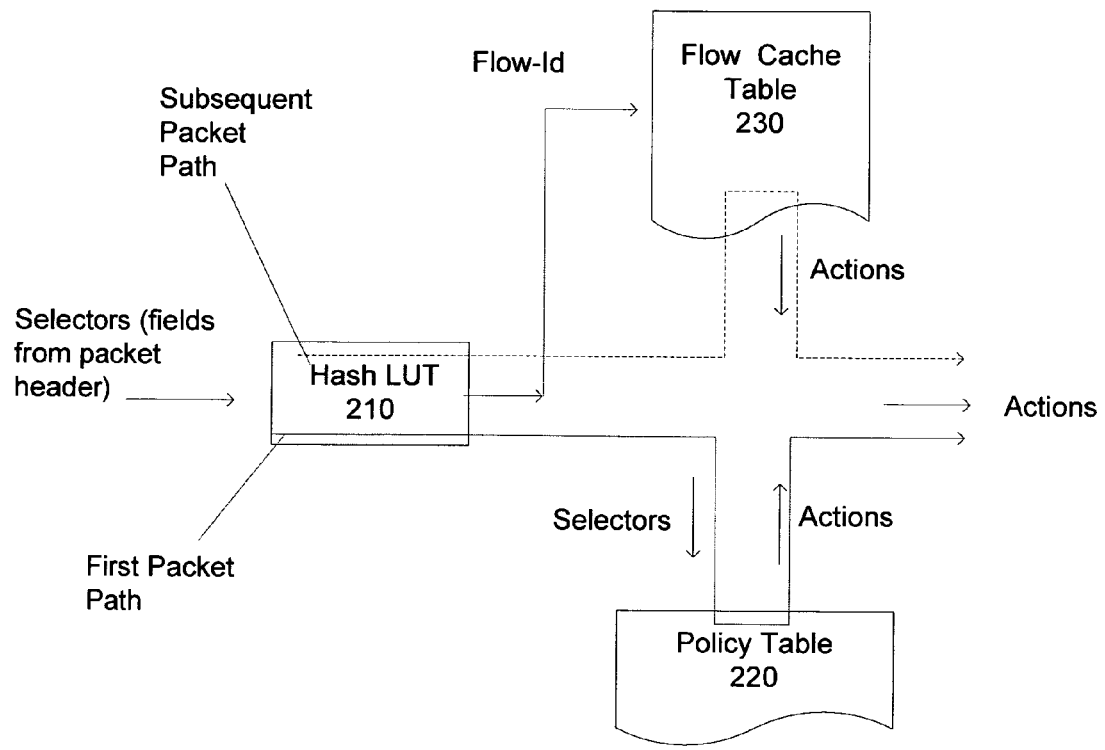
FIG. 2 shows a logical block-diagram of packet classification that uses a flow cache, in accordance with some embodiments of the present invention.

FIG. 2 shows a logical block-diagram of packet classification that uses a flow cache, in accordance with some embodiments of the present invention. For example, some embodiments may include use of a hash lookup block 210, policy table 220, and flow cache table 230.

Hash lookup block 210 may be capable to determine a Flow ID (i.e., an index into flow cache table 230) for a packet. For example, hash lookup block 210 may utilize the 5 tuple (i.e., source IP address, destination IP address, source port, destination port, and protocol) of a packet to determine a Flow ID.

Policy table 220 may be used to perform a full policy lookup for a first packet received for each connection based on selectors from the packet. For example, selectors may include fields from the packet header such as those described earlier to determine a Flow ID. For example, a full policy lookup may include prefix matching on the source and destination IP addresses, range matching on the source and destination TCP/UDP port numbers, exact matching on the protocol field, as well as consideration of other fields and factors. The policy lookup may determine the actions to be performed for the packet. For example, actions may include but are not limited to counting packet, forwarding packet, dropping packet, perform network address translation on the packet header, IPsec encryption or decryption and authentication of the packet.

Flow cache table 230 may include entries associated with one or more connection. An entry may include one or more action associated with each connection. An entry in flow cache table 230 may be retrieved based on the Flow ID from hash lookup table 210.

For example, for the first packet for a connection, hash lookup table 210 may use fields from the packet header such as those described earlier to determine a Flow ID. Hash lookup table 210 may provide a Flow ID to flow cache table 230. For a first packet for a connection, hash lookup table 210 may not have any entry associated with the connection. An empty entry may be added to hash lookup table 210 for the connection. Policy table 220 may perform a policy lookup using at least some of the same parameters used to determine the Flow ID for the first packet. The determined one or more actions may be stored in the empty entry in flow cache table 230 created for the first packet for the connection. Along with the actions, an expiry timestamp may also be stored in the flow cache entry. The expiry timestamp may be determined by adding the current system time to a global variable timestamp_fast_forward and the expiry interval of the specific TCP, UDP or other applicable protocol.

For a subsequent packet for the connection, a Flow ID may be determined in a similar manner as for the first packet for the connection. The Flow ID may be provided to flow cache table 230 and an associated entry retrieved for such Flow ID. If the entry has not expired, one or more action provided by the entry may be executed on the packet and thereby avoiding a full policy lookup. For example, actions that may be executed include but are not limited to count the packet, forward the packet, drop the packet, perform network address translation on the packet header, encrypt or decrypt the packet based on IPsec protocol. These actions may be performed by the packet processing engines subsequent to the flow classification.

Figure 3:
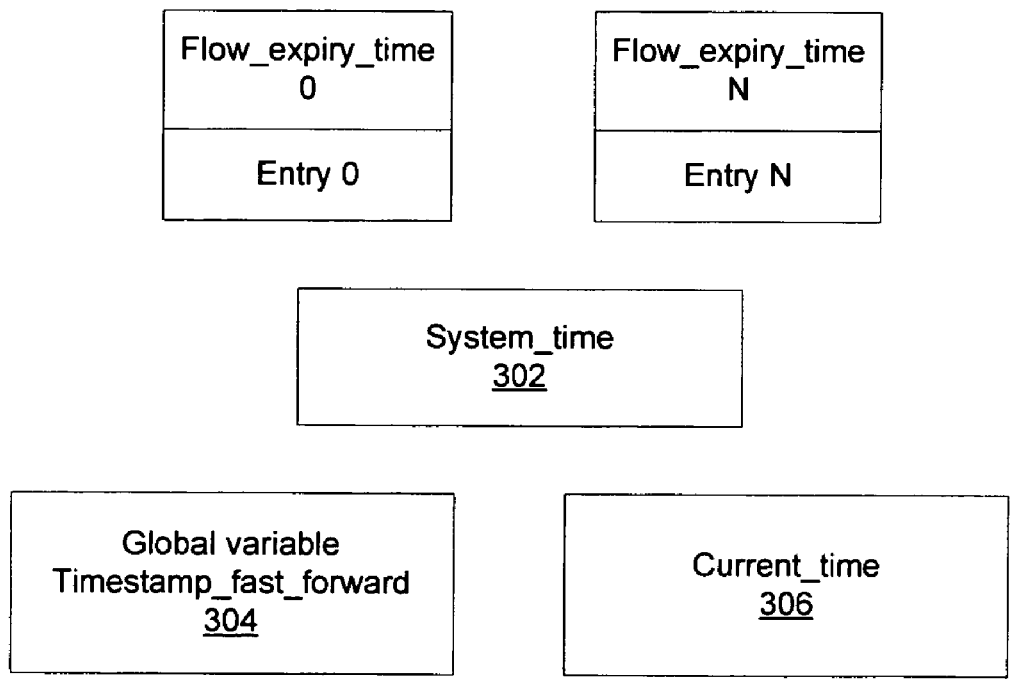
FIG. 3 shows elements that may be used in some embodiments of the present invention.

FIG. 3 shows elements that may be used in some embodiments of the present invention. For example, the elements may be stored in a memory device. For example, entries 0 to N, where N>1 may be stored in a flow cache table, although entries may be stored in other types of tables. Each of entries 0 to N may have associated flow expiry times 0 to N. Expiry times may specify a time when the entry is to become invalid.

Variable system_time 302 may represent actual current system time. For example, system_time 302 may be used to mark a receipt time of each received packet. Global variable timestamp_fast_forward 304 may be used to invalidate one or more flow cache entries. For example, to invalidate one or more entries, variable timestamp_fast_forward 304 may be incremented by a large interval. For example, the large interval may be large enough such that when variable timestamp_fast forward 304 is added to a current value of system_time 302 and compared against the expiry time for the entry, the entry will be considered expired. Variable current_time 306 may be used to check whether an entry is to be updated or invalidated. For example, in response to a retrieval of an entry from a flow cache, variable current_time 306 may be set to equal a sum of variables system_time 302 and timestamp_fast_forward 304. The expiration of the entry may depend on whether the expiry time of the flow entry exceeds that of variable current_time 306. The timestamp values may be maintained as 32 bit values with a granularity of 1 minute, although other numbers of bits and granularities may be used.

Figure 4:
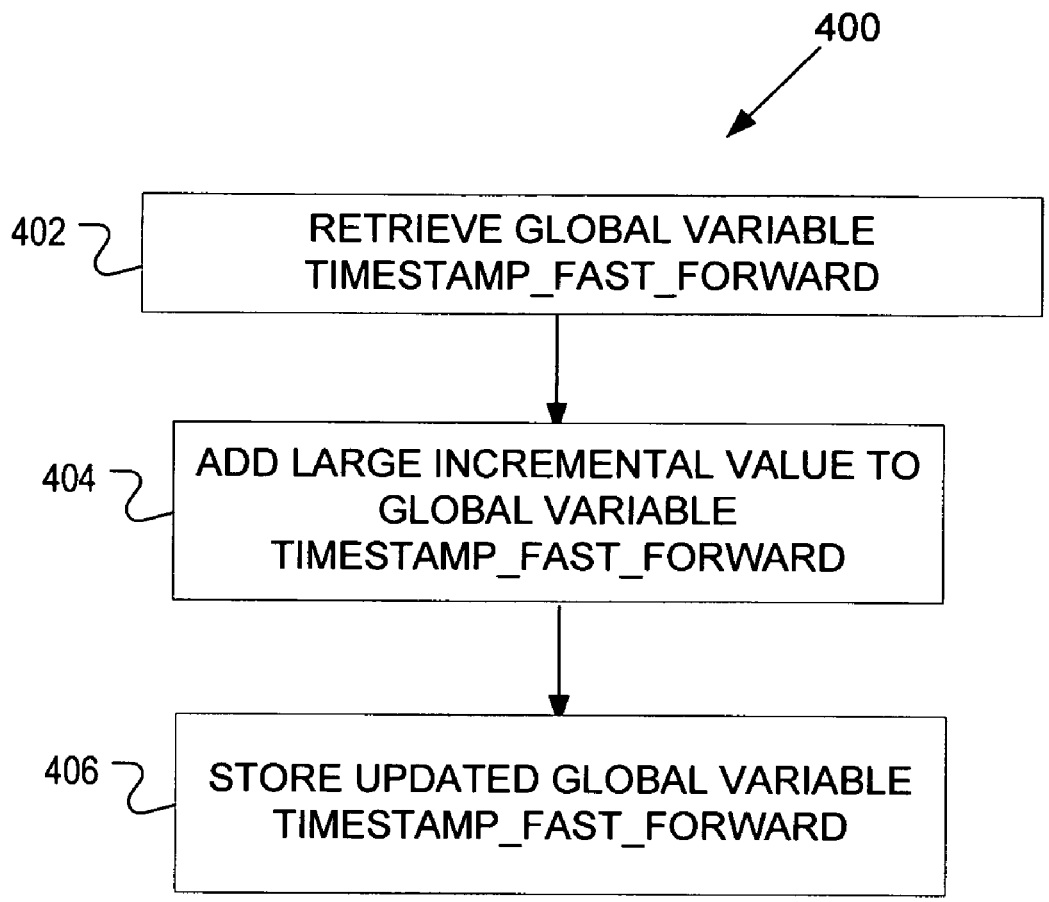
FIG. 4 shows a flow chart of a process that can be used to invalidate all entries in a flow cache, in accordance with some embodiments of the present invention.

FIG. 4 shows a flow chart of a process that can be used to invalidate all entries in a flow cache, in accordance with some embodiments of the present invention. For example, the process of FIG. 4 may be used when any classification rule or policy is updated. For example, if an administrator decides to change actions associated with certain types of packets, then a rule may be updated. Block 402 includes retrieving the global variable timestamp_fast_forward. Block 404 includes adding a large incremental value to the variable time stamp fast forward. For example, the large incremental value may be the maximum of the expiry time of all protocols, although other values may be used. Block 406 includes storing the updated variable timestamp_fast_forward.

Figure 5:
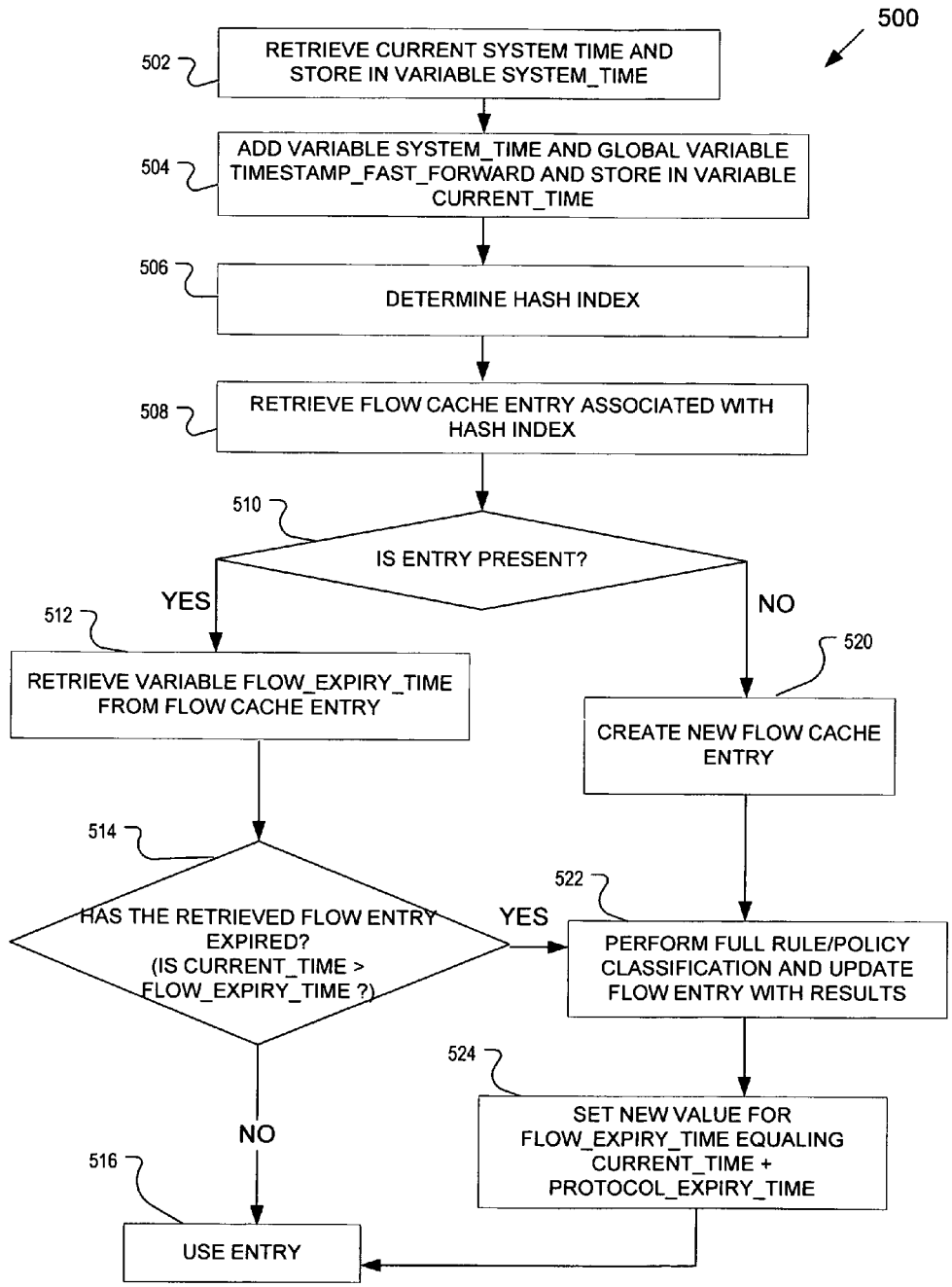
FIG. 5 shows a flow diagram that may be used when a packet is processed to determine whether the entry associated with the flow that the packet belongs to is invalid, in accordance with some embodiments of the present invention.

FIG. 5 shows a flow diagram that may be used to determine whether an entry associated with a flow is invalid, in accordance with some embodiments of the present invention.

Block 502 may include retrieving the current value of system time and storing it in variable system_time.

Block 504 may include adding the value of the global variable timestamp_fast_forward to the value stored by variable system_time and storing the result in a variable current_time. For example, if all entries in the flow cache table are to be invalidated, then variable timestamp_fast_forward may have been set to a large value previously. For example, execution of the process of FIG. 4 may be used to invalidate all entries by incrementing variable timestamp_fast_forward by a large value.

Block 506 may include determining the hash index for a received packet. For example, the hash index may be determined from some portions of a header of a packet such as but not limited to IP source, IP destination, TCP source port, TCP destination port, and protocol for the packet.

Block 508 may include retrieving the entry corresponding to the hash index from the flow cache table.

Block 510 may include checking if the entry corresponding to the hash index is actually present in the flow cache table. If the entry is present, block 512 may follow block 510. If the entry is not present, then block 520 may follow block 510. Block 520 may include creating a new flow cache entry corresponding to the entry that was requested but not present in the flow cache table.

Block 512 may include retrieving the value of variable flow_expiry_time in the flow cache entry.

Block 514 may include determining whether the retrieved flow entry has expired. Block 514 may determine if the value of the variable current_time determined in block 504 is greater than the value of the variable flow_expiry_time. In some embodiments, block 514 may determine if the value of the variable current_time determined in block 504 is greater than or equal to the value of the variable flow_expiry_time. If the value of variable current_time is not greater than that of variable flow_expiry_time, then the entry is not expired and block 516 may follow block 514. If the value of variable current_time is greater than that of variable flow_expiry_time, the flow entry has expired and block 522 may follow block 514. Note that if all existing entries are to be expired, then the global variable timestamp_fast_forward is incremented by a large value as described in block 504.

If the flow entry is expired as determined by block 514 or a new flow entry is created per block 520, then block 522 may include performing a full classification or policy lookup on the packet and storing the actions specified by the policy in the flow entry.

Block 524 may include storing a new value for the flow_expiry_time in the flow cache entry. The new value of flow_expiry_time may be determined by a sum of the variable current_time (determined in block 502) and the expiry time of the protocol (for example TCP or UDP) associated with the packet, although other expiry times may be used.

Block 516 may follow block 514 or block 524. Block 516 may include using the entry by retrieving the actions stored in the entry and executing the actions on the packet.

Embodiments of the present invention may be implemented as any or a combination of: one or more microchips or integrated circuits interconnected using a motherboard, hardwired logic, software stored by a memory device and executed by a microprocessor, firmware, an application specific integrated circuit (ASIC), and/or a field programmable gate array (FPGA). The term "logic" may include, by way of example, software or hardware and/or combinations of software and hardware.

Embodiments of the present invention may be provided, for example, as a computer program product which may include one or more machine-readable media having stored thereon machine-executable instructions that, when executed by one or more machines such as a computer, network of computers, or other electronic devices, may result in the one or more machines carrying out operations in accordance with embodiments of the present invention. A machine-readable medium may include, but is not limited to, floppy diskettes, optical disks, CD-ROMs (Compact Disc-Read Only Memories), and magneto-optical disks, ROMs (Read Only Memories), RAMs (Random Access Memories), EPROMs (Erasable Programmable Read Only Memories), EEPROMs (Electrically Erasable Programmable Read Only Memories), magnetic or optical cards, flash memory, or other type of media/machine-readable medium suitable for storing machine-executable instructions.

Moreover, embodiments of the present invention may also be downloaded as a computer program product, wherein the program may be transferred from a remote computer (e.g., a server) to a requesting computer (e.g., a client) by way of one or more data signals embodied in and/or modulated by a carrier wave or other propagation medium via a communication link (e.g., a modem and/or network connection). Accordingly, as used herein, a machine-readable medium may, but is not required to, comprise such a carrier wave.

The drawings and the forgoing description gave examples of the present invention. Although depicted as a number of disparate functional items, those skilled in the art will appreciate that one or more of such elements may well be combined into single functional elements. Alternatively, certain elements may be split into multiple functional elements. Elements from one embodiment may be added to another embodiment. For example, orders of processes described herein may be changed and are not limited to the manner described herein. The scope of the present invention, however, is by no means limited by these specific examples. Numerous variations, whether explicitly given in the specification or not, such as differences in structure, dimension, and use of material, are possible. The scope of the invention is at least as broad as given by the following claims.

What is claimed is:

1. An apparatus comprising:
   a flow cache to store entries;
   logic to invalidate entries in the flow cache in part by increasing a time incrementing variable by a large increment, wherein the large increment is to cause a corresponding entry in the flow cache to become expired;
   logic to retrieve an entry from the flow cache in part in response to receipt of a packet;
   logic to set a current time variable for the entry to be a sum of a current system time and the time incrementing variable; and
   logic to determine whether the entry is valid in part based on the current time variable exceeding the expiration time of the entry.

2. The apparatus of claim 1, further comprising:
   logic to update the entry in response to the entry being determined to be expired.

3. The apparatus of claim 2, further comprising:
   logic to set the expiration time of the updated entry to be a sum of the current time variable and an expiration time of a protocol associated with the entry.

4. The apparatus of claim 1, wherein the large increment comprises the maximum of the expiry time of all protocols associated with entries in the flow cache.

5. The apparatus of claim 1, wherein the logic to invalidate entries is to invalidate all entries in the flow cache in response to when any classification rule is updated.

6. A method comprising:
   invalidating entries in a table in part by increasing a time incrementing variable by a large increment, wherein the large increment is to cause a corresponding entry in the table to become expired;
   identifying an entry in the table;
   setting a current time variable for the entry to be a sum of a current system time and the time incrementing variable; and
   determining whether the entry is valid in part based on the current time variable exceeding an expiration time of the entry.

7. The method of claim 6, further comprising:
   updating the entry in response to the entry being determined to be expired.

8. The method of claim 7, further comprising:
setting the expiration time of the updated entry to be a sum of the current time variable and an expiration time of a protocol associated with the entry.

9. The method of claim 6, wherein the large increment comprises the maximum of the expiry time of all protocols associated with entries in the table.

10. The method of claim 6, further comprising:
invalidating all entries in the table in response to when any classification rule is updated.

11. The method of claim 6, wherein the table comprises a flow cache table.

12. The method of claim 6, wherein identifying an entry in the table comprises determining a hash index based on a portion of a packet.

13. A computer-readable medium comprising instructions stored thereon which when executed by a machine cause the machine to:
invalidate entries in a flow cache in part by increasing a time incrementing variable by a large increment, wherein the large increment is to cause a corresponding entry in the flow cache to become expired;
determine a hash index based on a portion of a packet;
determine an entry from the flow cache based on the hash index; and
set a current time variable for the entry to be a sum of a current system time and the time incrementing variable, and
determine whether the entry is valid in part based on the current time variable exceeding an expiration time of the entry.

14. The computer-readable medium of claim 13, further comprising instructions stored thereon which when executed by a machine cause the machine to:
update the entry in response to the entry determined to be expired.

15. The computer-readable medium of claim 14, further comprising instructions stored thereon which when executed by a machine cause the machine to:
set the expiration time of the updated entry to be a sum of the current time variable and an expiration time of a protocol associated with the entry.

16. The computer-readable medium of claim 13, wherein the large increment comprises the maximum of the expiry time of all protocols associated with entries in the flow cache.

17. The computer-readable medium of claim 13, further comprising instructions stored thereon which when executed by a machine cause the machine to:
invalidate all entries in the flow cache in response to when any classification rule is updated.

18. A system comprising:
a system fabric;
a line card comprising:
a packet processor;
logic to store entries in a flow cache,
logic to invalidate entries in the flow cache in part by increasing a time incrementing variable by a large increment, wherein the large increment is to cause a corresponding entry in the flow cache to become expired,
logic to retrieve an entry from the flow cache in part in response to receipt of a packet,
logic to set a current time variable for the entry to be a sum of a current system time and the time incrementing variable, and
logic to determine whether the entry is valid in part based on the current time variable exceeding the expiration time of the entry.

19. The system of claim 18, wherein the line card further comprises:
logic to update the entry in response to the entry determined expired.

20. The system of claim 19, wherein the line card further comprises:
logic to set the expiration time of the updated entry to be a sum of the current time variable and an expiration time of a protocol associated with the entry.

21. The system of claim 18, wherein the large increment comprises the maximum of the expiry time of all protocols associated with entries in the flow cache.

22. The system of claim 18, wherein the logic to invalidate entries is to invalidate all entries in the flow cache in response to when any classification rule is updated.

* * * * *